Sept. 26, 1950 L. E. COX 2,523,820
WEANING BASKET
Filed Dec. 10, 1945
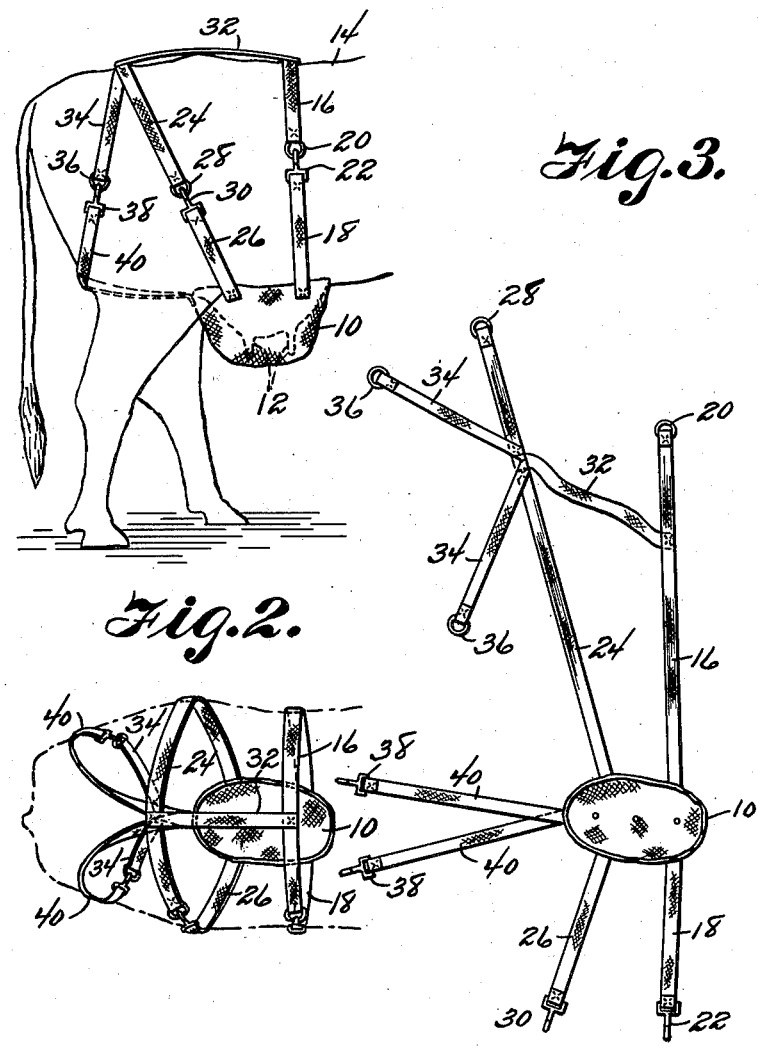
INVENTOR.
Laura E. Cox
BY Victor J. Evans & Co.
ATTORNEYS Patented Sept. 26, 1950

2,523,820

UNITED STATES PATENT OFFICE 2,523,820

WEANING BASKET

Laura E. Cox, Brownfield, Ill.

Application December 10, 1945, Serial No. 633,945

1 Claim. (Cl. 119—146)

This invention relates to a weaning basket for livestock.

An object of this invention is to provide a device that will prevent the young of livestock from feeding and thus depriving the farmer of milk for market.

Another object of the invention is to provide a device that is simple, easily applied and inexpensive to manufacture.

With the above and other objects in view the invention consists of the details of construction arrangement and combination of parts more fully hereinafter described, claimed and illustrated in the accompanying drawing in which:

Figure 1 is an elevational view of the device in position on a cow.

Figure 2 is a top plan view thereof, and

Figure 3 is a plan view of the device before attachment.

Referring more in detail to the drawing the numeral 10 designates the basket which may be made of any waterproof material and is adapted to fit over the teats 12 in close contact with the body of the animal 14.

The forward end of the basket 10 is supported by bands 16 and 18 respectively which extend transversely around the back of the animal and the band 16 is provided with a ring 20 to receive the snap hook 22 on the band 18.

Adjacent the rear end of the basket bands 24 and 26, are secured thereto, which extend over the rump of the animal, and the band 24 is provided with a loop 28 to receive the snap hook 30 on the band 26.

A back strap 32 is connected at its ends to bands 16 and 24. The back strap 32 is disposed longitudinally upon the back of the animal, and connected at the point where the back strap 32 is connected to the band 24 are likewise secured rump straps 34 which have loops 36 thereon to receive snap hooks 38 on the rump straps 40 connected at rear end of the basket 10.

Thus the basket is retained in fixed relation to the animal at all times and cannot be disturbed by the young of the animal.

While there has been illustrated and described one form of the invention it is to be understood that in practice various alterations may be made and the right and privilege of changing the form of the details or otherwise altering the arrangement of the various elements and their relation to each other is reserved providing such changes do not extend beyond the spirit of the invention or the scope of the appended claim.

Having thus described the invention what is claimed as new and desired to be secured by Letters Patent is:

A device of the character described comprising a basket shaped body, a pair of bands secured to said basket adjacent one end thereof and adapted to extend in opposite directions from said basket when said basket is in use, a second pair of bands secured to the opposite end of the basket centrally thereof and said second pair of bands adapted to extend in diverging inclined relation to each other outwardly of said body, a third pair of bands connected to the body intermediate of said first and second pair of bands and adapted to extend in opposite directions from said body when said basket is in use, a back band connecting one of each of said first and third pair of bands, a pair of rump straps connected at one end of each strap to the said one third band at the point of connection of said one third band to said back band, and detachable fastening means at the end of each band so that said basket can be attached to the body of an animal.

LAURA E. COX.

REFERENCES CITED

The following references are of record in the file of this patent:

UNITED STATES PATENTS

| Number | Name | Date |
|---|---|---|
| 462,664 | Chase | Nov. 3, 1891 |
| 1,549,598 | Millsap | Aug. 11, 1925 |

FOREIGN PATENTS

| Number | Country | Date |
|---|---|---|
| 10,059 | Great Britain | Feb. 2, 1903 |